United States Patent
Kantor et al.

(10) Patent No.: US 6,897,711 B1
(45) Date of Patent: May 24, 2005

(54) VOLTAGE REGULATED TRANSISTOR DRIVER

(75) Inventors: Jill N. Kantor, New Hudson, MI (US); Robert J. Disser, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/767,134

(22) Filed: Jan. 28, 2004

(51) Int. Cl.$^7$ ................................................. G05F 1/10
(52) U.S. Cl. ..................................................... 327/536
(58) Field of Search ................................. 327/390, 530, 327/534, 535, 536, 537, 538, 540, 541, 543

(56) References Cited

U.S. PATENT DOCUMENTS 6,642,774 B1 * 11/2003 Li ............................... 327/536
6,791,212 B2 * 9/2004 Pulvirenti et al. ............ 307/113

* cited by examiner

Primary Examiner—Jeffrey Zweizig
(74) Attorney, Agent, or Firm—Michael D. Smith

(57) ABSTRACT

A voltage regulated transistor driver receives an electrical communication of a source voltage from a voltage source, and in response thereto, electrically communicates a regulated driver voltage to one or more transistors for the purpose of driving the transistor(s). In a voltage multiplier mode of the transistor driver, the regulated driver voltage is greater than the source voltage. In a voltage follower mode of the transistor driver, the regulated driver voltage approaches the source voltage to thereby equal or approximate the source voltage.

25 Claims, 17 Drawing Sheets

US 6,897,711 B1

VOLTAGE REGULATED TRANSISTOR DRIVER

TECNICAL FIELD OF THE INVENTION

The present invention generally relates to transistor drive voltages for driving one or more transistors. The present invention specifically relates a voltage regulation of the transistor drive voltage.

BACKGROUND OF THE INVENTION

FIG. 1 illustrates a known implementation of a transistor driver in the form of a conventional voltage doubler 30. In this implementation, a voltage source 20 electrically communicates a source voltage $V_S$ to voltage doubler 30, which in turn electrically communicates an unregulated drive voltage $V_{UD}$ to a transistor array of various well known types of transistors as illustrated in FIG. 1. Under all operating conditions, voltage doubler 30 doubles the source voltage $V_S$ to thereby generate the unregulated drive voltage $V_{UD}$. Thus, one drawback to the use of voltage doubler 30 as a transistor driver is the potential to generate unregulated driver voltage $V_{UD}$ with a magnitude exceeding a safe operating level for the transistors (e.g., unregulated driver voltage $V_{UD}$ having a magnitude of 32.0 volts when source voltage $V_S$ has a magnitude of 16.0 volts). As such, to avoid any damage to the transistors, the source voltage $V_S$ can be kept at low voltage levels. However, these low voltage levels may not be suitable for the operating environment of voltage source 20 (e.g., an employment of voltage source 20 within an automobile).

SUMMARY OF THE INVENTION

The present invention improves upon the prior art by providing a voltage regulated transistor driver as an improvement of unregulated transistor drivers. One form of the present invention voltage regulated transistor driver employed with a system further employing a voltage source and one or more transistors. The voltage regulated transistor driver employs a variable voltage multiplier and a voltage driver controller. The variable voltage multiplier generates a regulated driver voltage for driving the transistor(s). In a voltage multiplier mode, the regulated driver voltage is greater than a source voltage electrically communicated to the voltage regulated transistor driver by the voltage source. In a voltage follower mode, the regulated driver voltage approaches the source voltage to thereby equal or approximate the source voltage. The voltage driver controller generates a driver control voltage indicative of a selection of one of the voltage multiplier mode and the voltage follower mode. The voltage driver controller electrically communicates the driver control voltage to the variable voltage multiplier to thereby set the voltage driver into one of the voltage multiplier mode and the voltage follower mode.

A second form of the present invention is a method of operating a transistor driver for regulating a driver voltage. The method involves a reception of an electrical communication of a source voltage from a voltage source, and an electrical communication of a regulated driver voltage to one or more transistors. In a voltage multiplier mode, the regulated driver voltage is greater than the source voltage. In a voltage follower mode, the regulated driver voltage approaches the source voltage to hereby equal or approximate the source voltage.

The terms "electrical communication" and "electrically communicates" as used herein encompass an electrical connection, an electrical coupling or any other technique for electrically interfacing devices (e.g., the multi-mode voltage driver and the voltage driver controller).

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENTS

Figure 1:
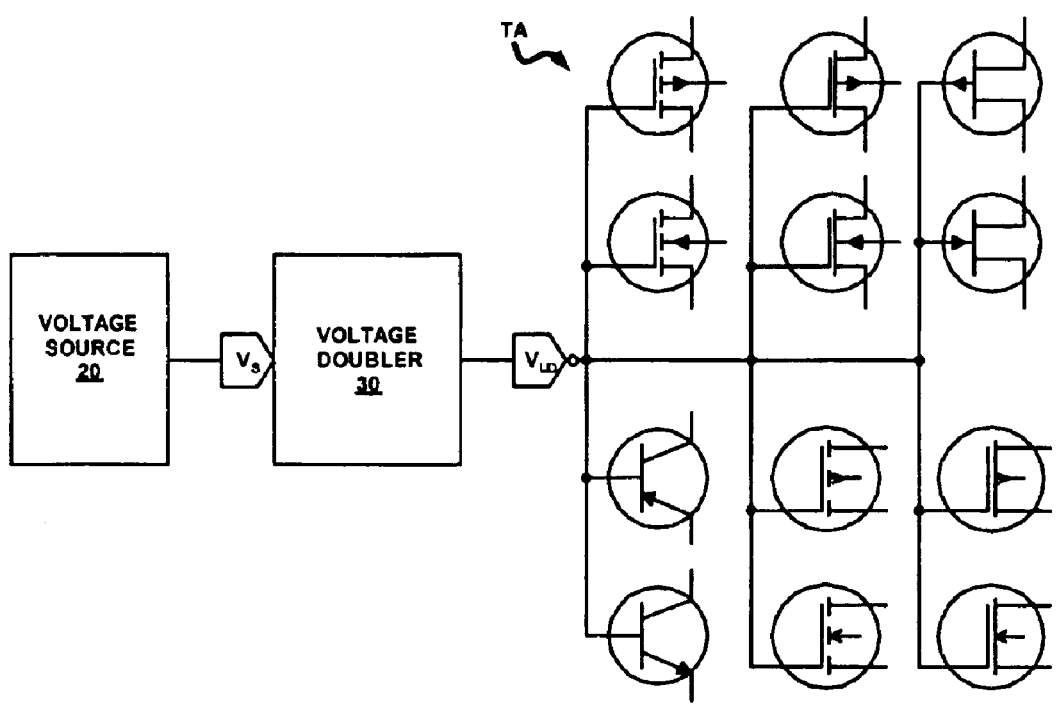
FIG. 1 illustrates one embodiment of an operating environment for an unregulated transistor driver as known in the art.
Figure 2:
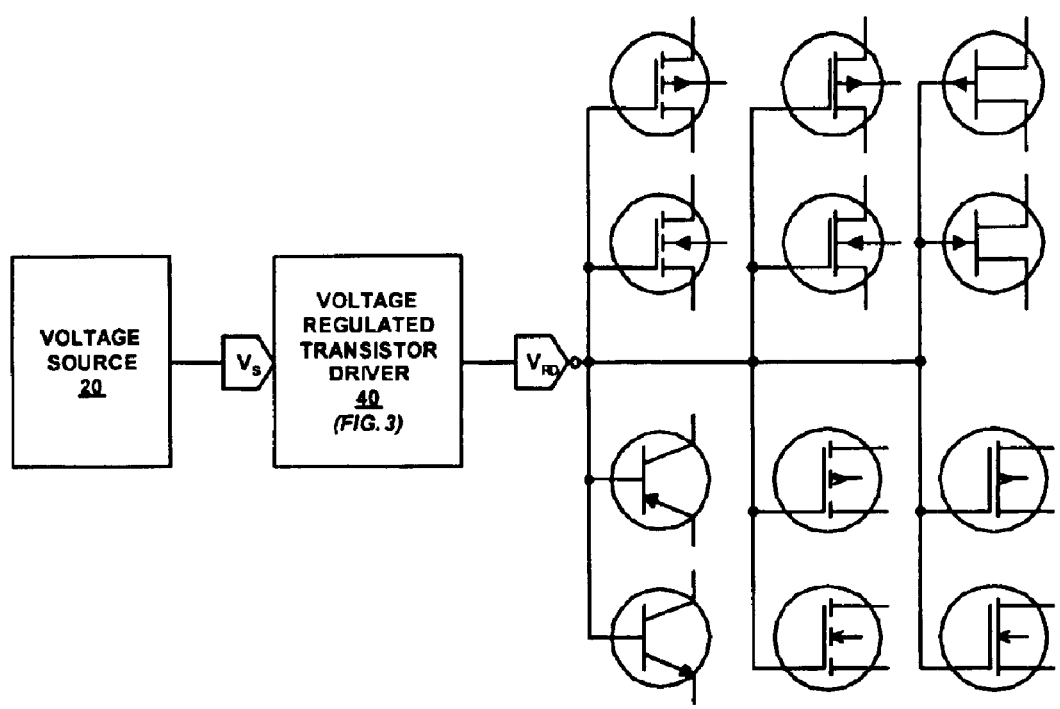
FIG. 2 illustrates one embodiment of an operating environment for a voltage regulated transistor driver in accordance with the present invention.

FIG. 2 illustrates an exemplary implementation of a voltage regulated transistor driver 40 of the present invention for purposes of understanding the inventive principles of the present invention. In this exemplary implementation, voltage source 20 electrically communicates a source voltage $V_S$ to transistor driver 40, which in turn electrically communicates a regulated driver voltage $V_{RD}$ to a transistor array of various well known types of transistors as illustrated in FIG. 2. Transistor driver 40 serves to generate the regulated driver voltage $V_{RD}$ in a manner that safely drives each transistor. To this end, transistor driver 40 is selectively operated between a voltage multiplier mode and a voltage follower mode.

In the voltage multiplier mode, regulated driver voltage $V_{RD}$ is greater than source voltage $V_S$ by a factor X that is any number greater than 1. In practice, factor X may be fixed or factor X may be variable.

In the voltage follower mode, regulated driver voltage $V_{RD}$ approaches source voltage $V_S$ to thereby equal or approximate source voltage $V_S$.

In one exemplary embodiment, transistor driver 40 is operated in the voltage multiplier mode as a voltage multiplier having a gain, fixed or varying, that is greater than 1, and in the voltage follower mode as a voltage multiplier having a gain equal to or approximating 1. In another exemplary embodiment, transistor driver 40 is operated in the voltage multiplier mode as a voltage multiplier having a gain, fixed or varying, that is greater than 1, and in the voltage follower mode as a disabled voltage multiplier that equals the source voltage $V_S$ minus any voltage looses due to the structural configuration of the voltage multiplier.

Furthermore, a selection of when to operate transistor driver 40 in the voltage multiplier mode or in the voltage follower mode can be dependent upon a magnitude of source voltage $V_S$ and/or a magnitude of regulated driver voltage $V_{RD}$. In one exemplary embodiment, transistor driver 40 is selectively operated in the voltage multiplier mode or in the voltage follower mode in dependence upon the magnitude of source voltage $V_S$ relative to a voltage threshold that defines a boundary between the voltage multiplier mode and the voltage follower mode. In another exemplary embodiment, transistor driver 40 is selectively operated in the voltage multiplier mode or in the voltage follower mode in dependence upon the magnitude of regulated driver voltage $V_{RD}$ relative to a voltage threshold that defines a boundary between the voltage multiplier mode and the voltage follower mode. In yet another exemplary embodiment, transistor driver 40 is selectively operated in the voltage multiplier mode or in the voltage follower mode in dependence upon the magnitude of regulated drive voltage $V_{RD}$ relative to one voltage threshold and the magnitude of source voltage $V_S$ relative to another voltage threshold, where both thresholds define the boundary between the voltage multiplier mode and the voltage follower mode.

From the aforementioned boundaries, those having ordinary skill will appreciate additional embodiments for establishing the boundary between the voltage multiplier mode and the voltage follower mode. In any case, the boundary can be implemented as a crossover boundary or a hysteresis boundary.

In practice, the structural configuration of transistor driver 40 can employ one or more components for implementing the inventive principles of the present invention. For multiple component configurations, the components can be assembled as a common unit or distributed throughout a working environment of transistor driver 40. The component(s) of transistor driver 40 may employ digital circuitry, analog circuitry, or both (e.g. an application specific integrated circuit). Also, the component(s) of transistor driver 40 may be programmable hardware, a dedicated state machine, or a hybrid combination of programmable and dedicated hardware. Furthermore, to facilitate the implementations of the principals of the present invention, the structural configuration of transistor driver 40 can further employ any control clocks, interfaces, signal conditioners, filters, Analog-to-Digital (A/D) converters, Digital-to-Analog (D/A) converters, communication ports, or other types of operators as would occur to those having ordinary skill in the art.

Transistor driver 40 is shown in FIG. 2 as driving the various well-known transistors for purposes of facilitating the preceding description of the inventive principles of the present invention. From this description, those having ordinary skill in the art will appreciate the applicability of the inventive principles of the present invention in driving one or more transistors of any type and in any configuration.

Figure 3:
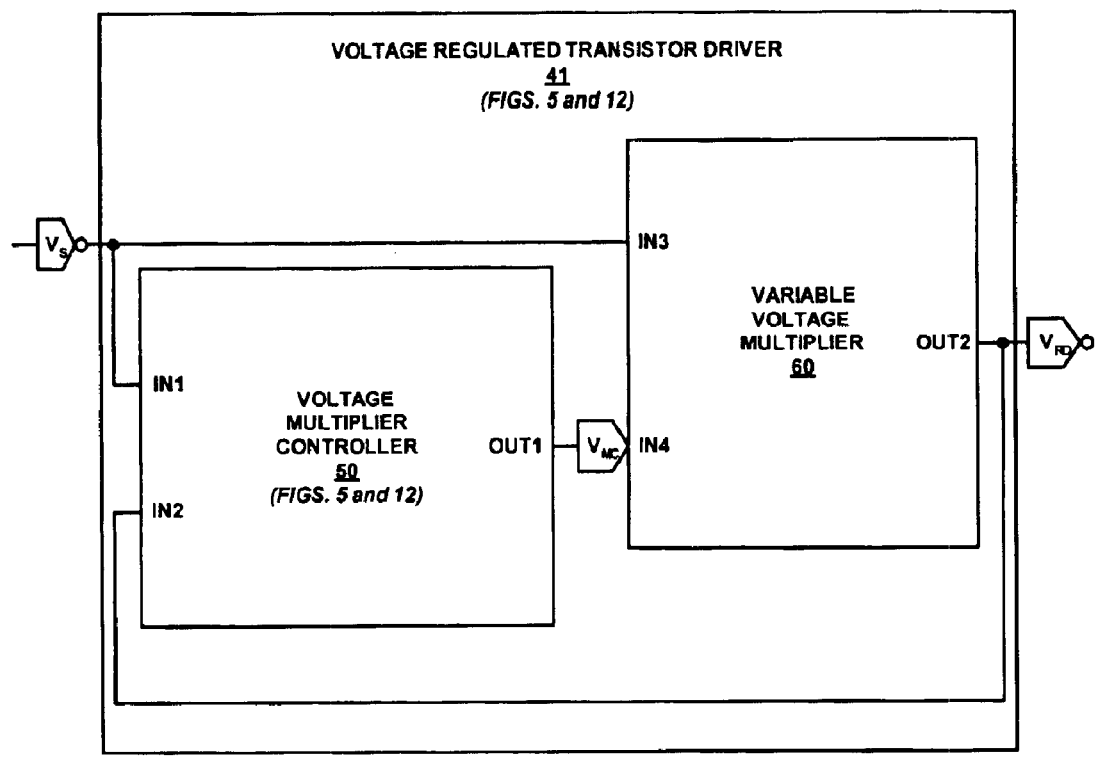
FIG. 3 illustrates one embodiment of the voltage regulated transistor driver illustrated in FIG. 2.

FIG. 3 illustrates a voltage regulated transistor driver 41 as one embodiment of voltage regulated transistor driver 40 (FIG. 2). Transistor driver 41 employs a voltage multiplier controller 50 and a variable voltage multiplier 60. Controller 50 receives an electrical communication of source voltage $V_S$ at an input IN1, and an electrical communication of regulated driver voltage $V_{RD}$ at an input IN2 from an output OUT2 of voltage multiplier 60. At an output OUT1, controller 50 generates a multiplier control voltage $V_{MC}$ for setting voltage multiplier 60 into either the voltage multiplier mode or the voltage follower mode. Controller 50 establishes the boundary between the voltage multiplier mode and the voltage follower mode in dependence upon a magnitude of source voltage $V_S$ and/or a magnitude of regulated drive voltage $V_{RD}$. Controller 50 electrically communicates multiplier control voltage $V_{MC}$ to an input IN4 of voltage multiplier 60, which also receives an electrical communication of source voltage $V_S$ at an input IN3.

In the voltage multiplier mode, voltage multiplier 60 generates regulated driver voltage $V_{RD}$ as a product of source voltage $V_S$ and a factor X that is a function of a frequency and a duty cycle of the multiplier control voltage $V_{MC}$, where X is any number greater than 1.

In one embodiment of the voltage follower mode, voltage multiplier 60 generates regulated driver voltage $V_{RD}$ as a product of source voltage $V_S$ and a factor X that is a function of a zero approach of the frequency and/or the duty cycle of the multiplier control voltage $V_{MC}$.

In another embodiment of the voltage follower mode, voltage multiplier 60 generates regulated driver voltage $V_{RD}$ as a voltage source $V_S$ minus any voltage losses due to the structural configuration of voltage multiplier 60.

The following TABLE 1 illustrates an exemplary operation of transistor driver 41 based on a high voltage threshold $V_{HVT}$ that defines a hysteresis boundary between the voltage multiplier mode and the voltage follower mode, and a low voltage threshold $V_{LVT}$ that defines a hysteresis boundary between a fixed version of the voltage multiplier mode and a varying version of the voltage multiplier mode:

TABLE 1

|  | Voltage Multiplier Mode | | Voltage Follower |
| --- | --- | --- | --- |
|  | Fixed Version | Varying Version | Mode |
| Hysteresis Boundary | $V_S < V_{HVT}$ and $V_{RD} < V_{LVT}$ | $V_S < V_{HVT}$ and $V_{RD} < V_{LVT}$ | $V_S > V_{HVT}$ |
| Regulated Drive Voltage $V_{RD}$ | $V_{RD} = (X1)V_S$ X1 (Fixed) > 1 | $V_{RD} = (X2)V_S$ X2 = f($V_{RD}$) X2 < X1 | $V_{RD} \rightarrow (X2)V_S$ |

Figure 4:
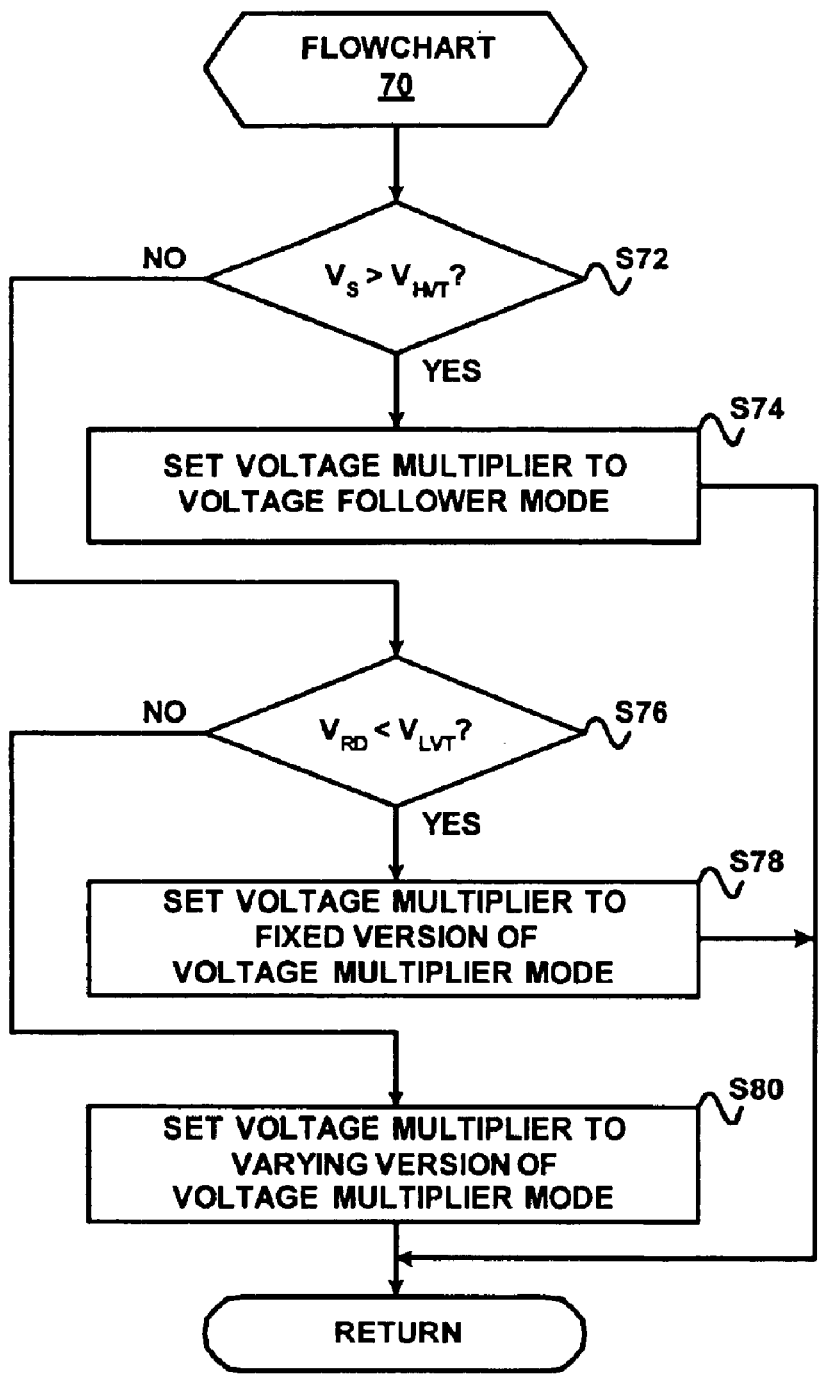
FIG. 4 illustrates a flowchart representative of a first embodiment of a transistor driver voltage regulation method in accordance with the present invention.

FIG. 4 illustrates a flowchart 70 representative of a method of operating transistor driver 41 in accordance with TABLE 1. During a stage S72, controller 50 (FIG. 3) ascertains whether source voltage $V_S$ is greater than high voltage threshold $V_{HVT}$. If so, then controller 50 proceeds to a stage S74 to set voltage multiplier 60 (FIG. 3) to the voltage follower mode via multiplier control voltage $V_{MC}$, and thereafter returns to stage S72.

Otherwise, controller 50 proceeds to a stage S76 to ascertain whether regulated drive voltage $V_{RD}$ is less than low voltage threshold $V_{LVT}$. If so, then controller 50 proceeds to a stage S78 to set voltage multiplier 60 to the fixed version of the voltage multiplier mode via multiplier control voltage $V_{MC}$, and thereafter returns to stage S72. Otherwise, controller 50 proceeds to a stage S80 to set voltage multiplier 60 to the varying version of the voltage multiplier mode via multiplier control voltage $V_{MC}$, and thereafter returns to stage S72.

In practice of flowchart 70, the structural configurations of controller 50 and voltage multiplier 60 can employ one or more components for implementing the inventive principles of the present invention. For multiple component configurations, the components can be assembled as a common unit or distributed throughout a working environment of controller 50 and voltage multiplier 60. The component(s) of controller 50 and voltage multiplier 60 may employ digital circuitry, analog circuitry, or both (e.g. an application specific integrated circuit). Also, the component(s) of controller 50 and voltage multiplier 60 may be programmable hardware, a dedicated state machine, or a hybrid combination of programmable and dedicated hardware. Furthermore, to facilitate the implementations of the principals of the present invention, the structural configuration of controller 50 and voltage multiplier 60 can further employ any control clocks, interfaces, signal conditioners, filters, Analog-to-Digital (A/D) converters, Digital-to-Analog (D/A) converters, communication ports, or other types of operators as would occur to those having ordinary skill in the art.

Moreover, controller 50 can be structured to generate a plurality of multiplier control voltages $V_{MC}$ whereby multiplier 60 is structured to input each multiplier control voltage $V_{MC}$ to thereby output one or more regulated driver voltage $V_{RD}$.

Figure 5:
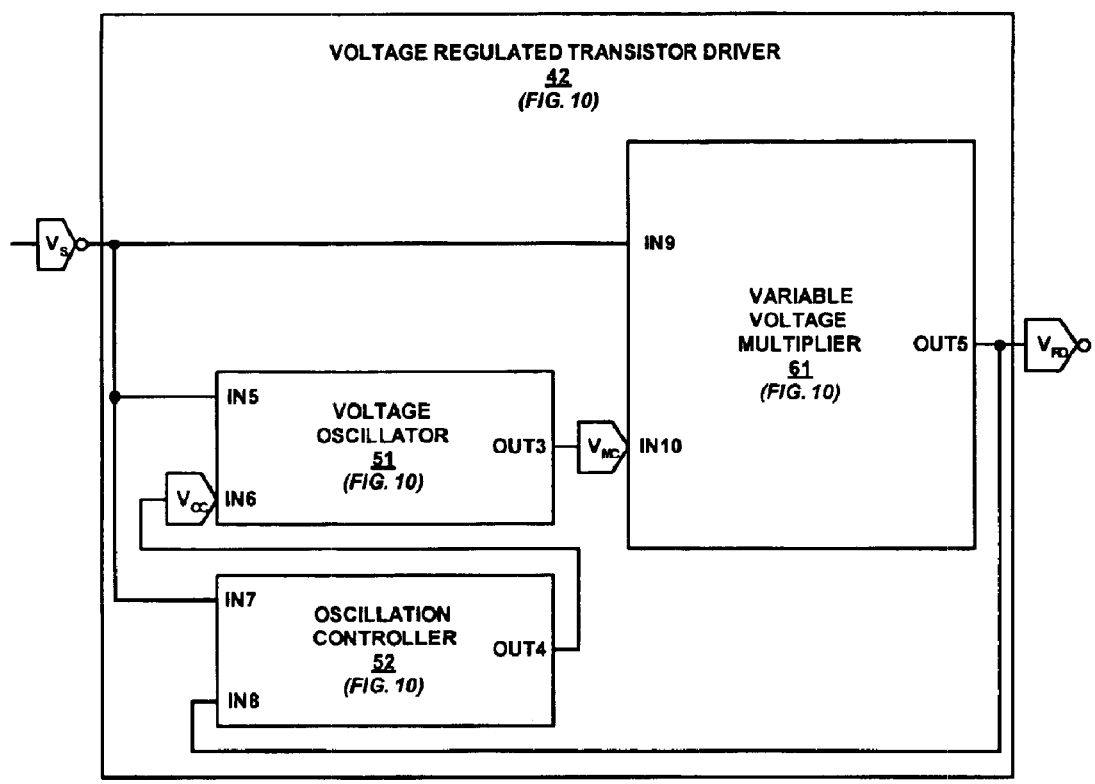
FIG. 5 illustrates a first embodiment in accordance with the present invention of the voltage regulated transistor driver illustrated in FIG. 3.

FIG. 5 illustrates a voltage regulated transistor driver 42 as one embodiment of transistor driver 41 (FIG. 3). Transistor driver 42 employs a voltage oscillator 51 and an oscillation controller 52, both of which constitute an embodiment of voltage multiplier controller 50 (FIG. 3). Transistor driver 42 further employs a variable voltage multiplier 61 as one embodiment of variable voltage multiplier 60 (FIG. 3).

Controller 52 receives an electrical communication of source voltage $V_S$ at an input IN7, and an electrical communication of regulated driver voltage $V_{RD}$ at an input IN8 from an output OUT5 of voltage multiplier 61. At an output OUT4, controller 52 generates an oscillation control voltage $V_{OC}$ for controlling a frequency and a duty cycle of a multiplier control voltage $V_{MC}$ as generated by voltage oscillator 51. Controller 52 electrically communicates oscillation control voltage $V_{OC}$ to an input IN6 of voltage oscillator 51, which also receives an electrical communication of source voltage $V_S$ at an input IN5. At an output OUT3, voltage oscillator 51 generates multiplier control voltage $V_{MC}$ for controlling a gain of voltage multiplier 61. Voltage oscillator 51 electrically communicates multiplier control voltage $V_{MC}$ to an input IN10 of voltage multiplier 61, which also receives an electrical communication of source voltage $V_S$ at an input IN9.

Figure 6:
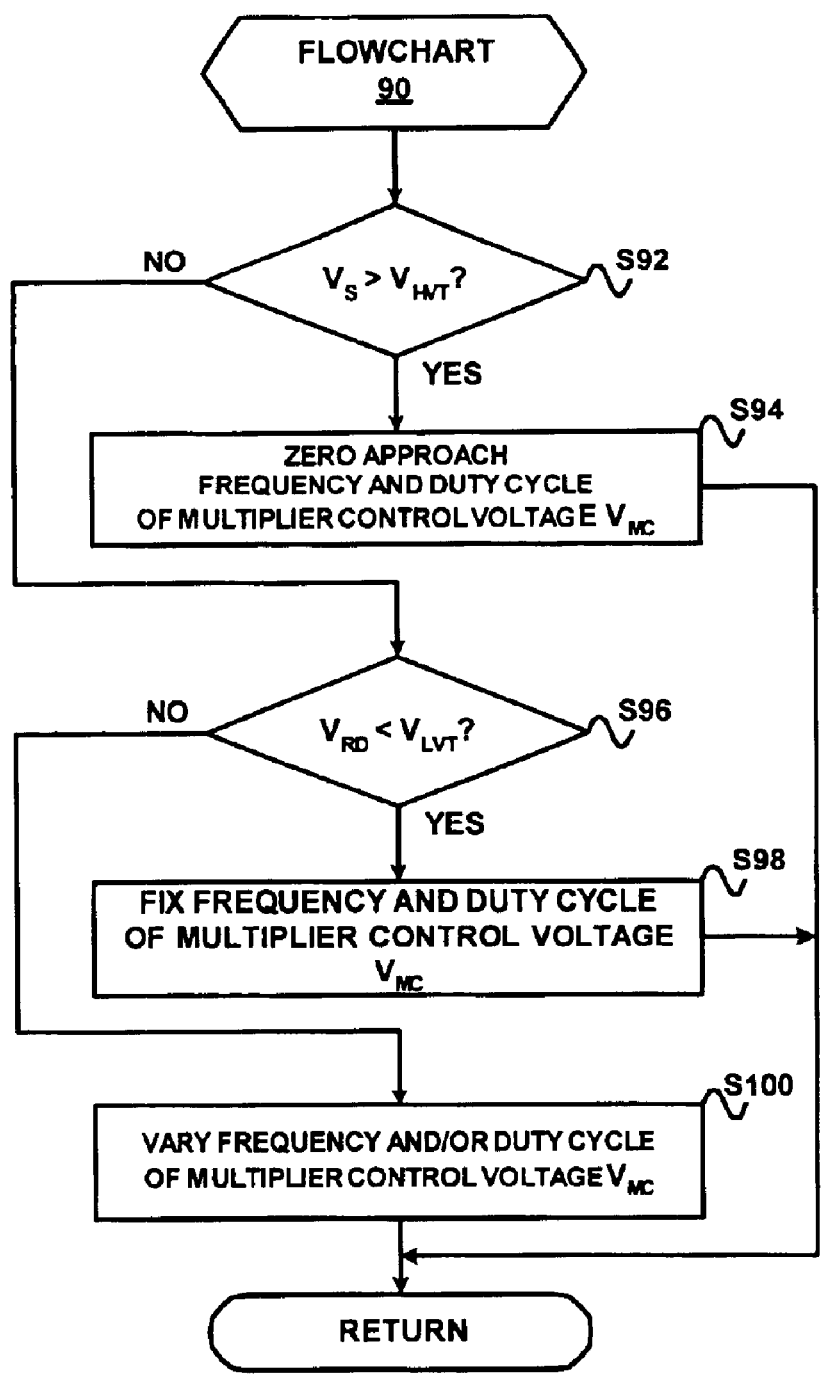
FIG. 6 illustrates a flowchart representative of one embodiment in accordance with the present invention of the transistor driver voltage regulation method illustrated in FIG. 4.

FIG. 6 illustrates a flowchart 90 representative of a method of operating transistor driver 42 in accordance with TABLE 1 as previously described herein. During a stage S92, controller 52 (FIG. 5) ascertains whether source voltage Vs is greater than high voltage threshold $V_{HVT}$. If so, then controller 52 proceeds to a stage S94 to zero approach a frequency and/or a duty cycle of multiplier control voltage $V_{MC}$ via oscillation control signal $V_{OC}$, and thereafter returns to stage S92.

Otherwise, controller 52 proceeds to a stage S96 to ascertain whether regulated drive voltage $V_{RD}$ is less than low voltage threshold $V_{LVT}$. If so, then controller 52 proceeds to a stage S98 to fix the frequency and the duty cycle of multiplier control voltage $V_{MC}$ via oscillation control signal $V_{OC}$, and thereafter returns to stage S92. Otherwise, controller 52 proceeds to a stage S100 to vary the frequency and/or the duty cycle of multiplier control voltage $V_{MC}$ via oscillation control signal $V_{OC}$, and thereafter returns to stage S92. In one embodiment, the frequency if varied and the duty cycle if varied are a function of the magnitude of the regulated drive voltage $V_{RD}$ whereby the frequency and/or the duty cycle are varied to decrease the gain of voltage multiplier 60 as the source voltage $V_S$ approaches high voltage threshold $V_{HVT}$, and whereby the frequency and/or the duty cycle are varied to increase the gain of voltage multiplier 60 as the regulated driver voltage $V_{RD}$ approaches low voltage threshold $V_{LVT}$.

An exemplary implementation of flowchart 90 by transistor driver 42 involving a sequential increase in source voltage $V_S$ will now be described herein. In this exemplary implementation, low voltage threshold $V_{LVT}$ equals 14.0 volts and high voltage threshold $V_{HVT}$ equals 15.0 volts.

Figure 7:
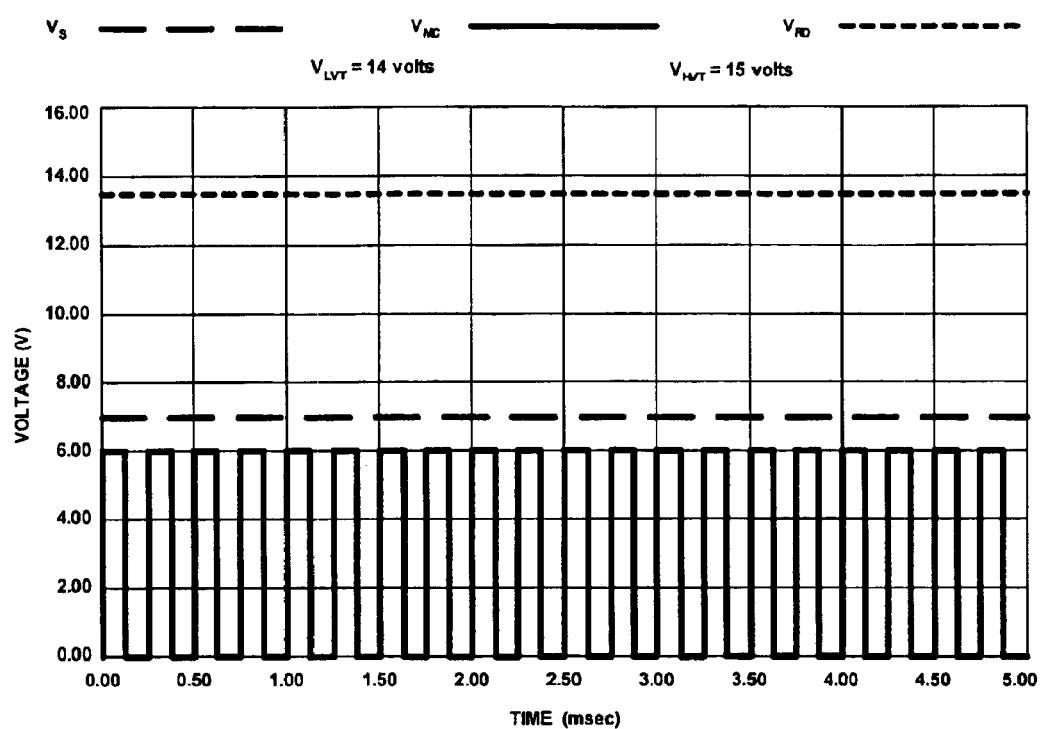
FIG. 7 illustrates a first exemplary fixed voltage multiplier mode during an implementation of the transistor driver voltage regulation method illustrated in FIG. 6 by the voltage regulated transistor driver illustrated in FIG. 5.

FIG. 7 illustrates source voltage $V_S$ equaling 7.0 volts, and regulated drive voltage $V_{RD}$ equaling 13.75 volts (i.e., the gain of voltage multiplier 61 is approximately 2.0). In accordance with stage S98 (FIG. 6), the frequency and the duty cycle for multiplier control voltage $V_{MC}$ are fixed in view of source voltage Vs being less than 15.0 volts and regulated drive voltage $V_{RD}$ being less than 14.0 volts.

Figure 8:
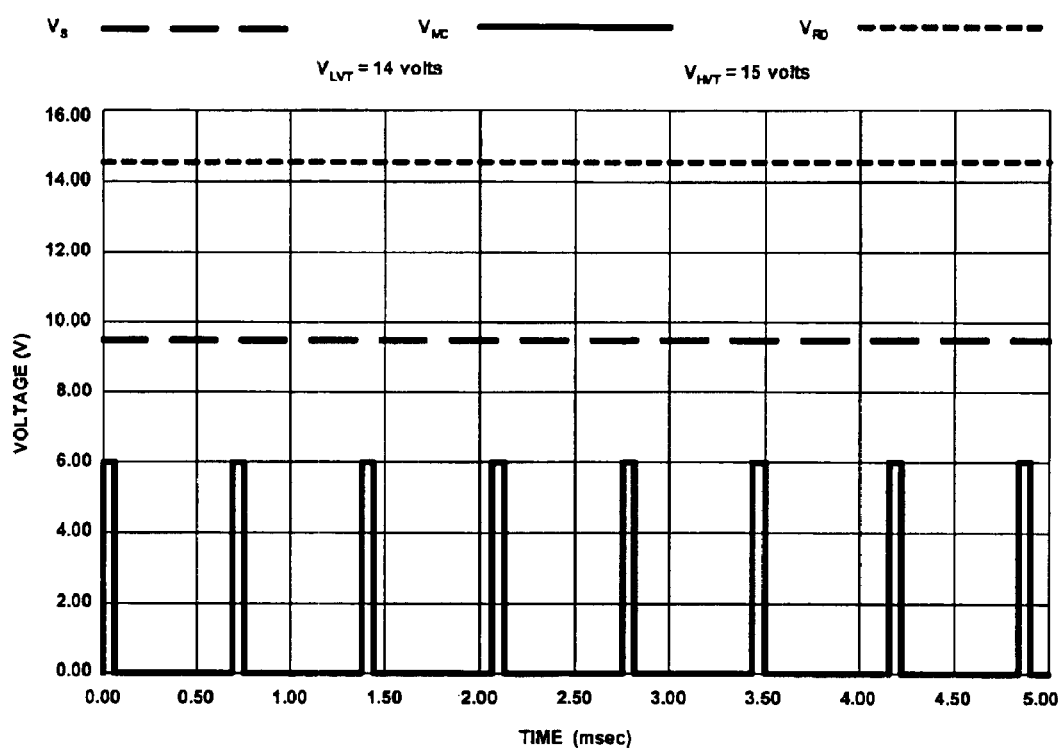
FIG. 8 illustrates a second exemplary varying voltage multiplier mode during an implementation of the transistor driver voltage regulation method illustrated in FIG. 6 by the voltage regulated transistor driver illustrated in FIG. 5.

FIG. 8 illustrates source voltage Vs equaling 9.5 volts, and regulated drive voltage $V_{RD}$ equaling 14.5 volts (i.e., the gain of voltage multiplier 61 is approximately 1.5). In accordance with stage S100 (FIG. 6), the frequency of multiplier control voltage $V_{MC}$ has been decreased and the duty cycle of multiplier control voltage $V_{MC}$ has been decreased in view of source voltage Vs being less than 15.0 volts and regulated drive voltage $V_{RD}$ being greater than 14.0 volts. Those having ordinary skill in the art will appreciate that the decrease in the frequency and the decrease of the duty cycle of multiplier control voltage $V_{MC}$ has decreased the gain of voltage multiplier 61 to thereby initiate a regulation of regulated drive voltage $V_{RD}$ relative to high voltage threshold $V_{HVT}$.

Figure 9:
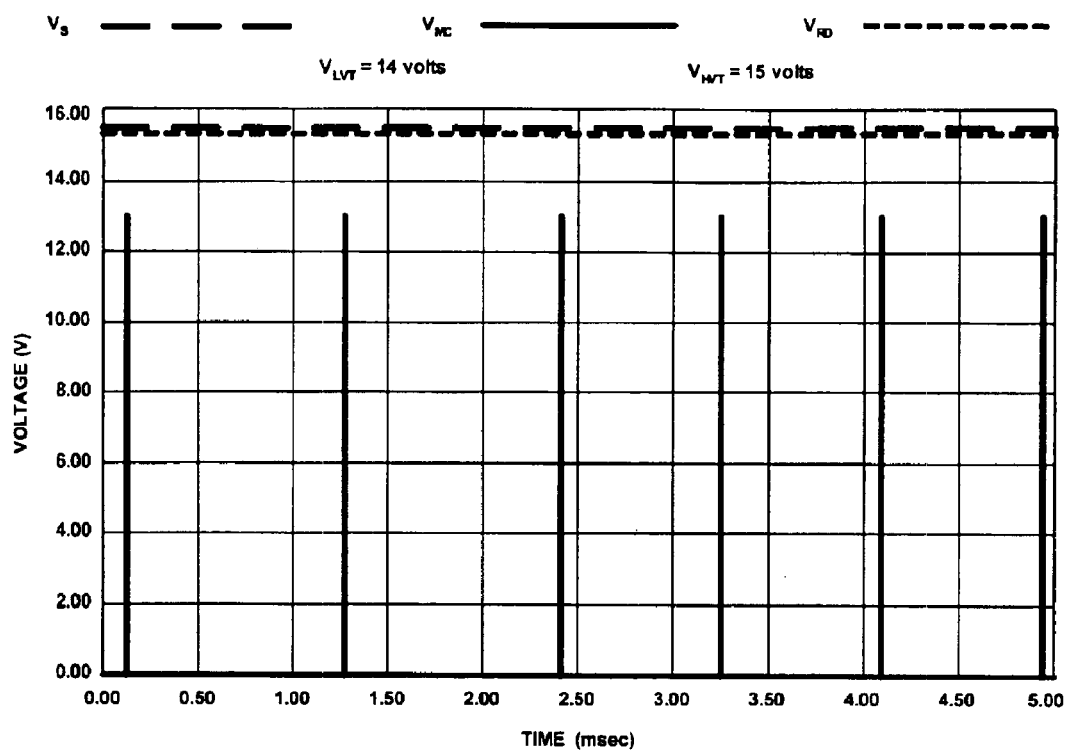
FIG. 9 illustrates an exemplary voltage follower mode during an implementation of the transistor driver voltage regulation method illustrated in FIG. 6 by the voltage regulated transistor driver illustrated in FIG. 5.

FIG. 9 illustrates source voltage $V_S$ equaling 15.5 volts, and regulated drive voltage $V_{RD}$ equaling 15.35 volts (i.e., the gain of voltage multiplier 61 is approximately 1.0). In accordance with stage S92, the frequency of multiplier control voltage $V_{MC}$ and the duty cycle of multiplier control voltage $V_{MC}$ have been zero approached in view of source voltage $V_S$ being greater than 15.0 volts. Those having ordinary skill in the art will appreciate that the zero approach of the frequency and the duty cycle of multiplier control voltage $V_{MC}$ has decreased the gain of voltage multiplier 61 approximately 1 to thereby complete a regulation of regulated drive voltage $V_{RD}$ relative to high voltage threshold $V_{HVT}$.

In practice, the structural configurations of voltage oscillator 51, controller 52 and voltage multiplier 61 can employ one or more components for implementing the inventive principles of the present invention. For multiple component configurations, the components can be assembled as a common unit or distributed throughout a working environment of voltage oscillator 51, controller 52 and voltage multiplier 61. The component(s) of voltage oscillator 51, controller 52 and voltage multiplier 61 may employ digital circuitry, analog circuitry, or both (e.g. an application specific integrated circuit). Also, the component(s) of voltage oscillator 51, controller 52 and voltage multiplier 61 may be programmable hardware, a dedicated state machine, or a hybrid combination of programmable and dedicated hardware. Furthermore, to facilitate the implementations of the principals of the present invention, the structural configuration of voltage oscillator 51, controller 52 and voltage multiplier 61 can further employ any control clocks, interfaces, signal conditioners, filters, Analog-to-Digital (A/D) converters, Digital-to-Analog (D/A) converters, communication ports, or other types of operators as would occur to those having ordinary skill in the art.

Figure 10:
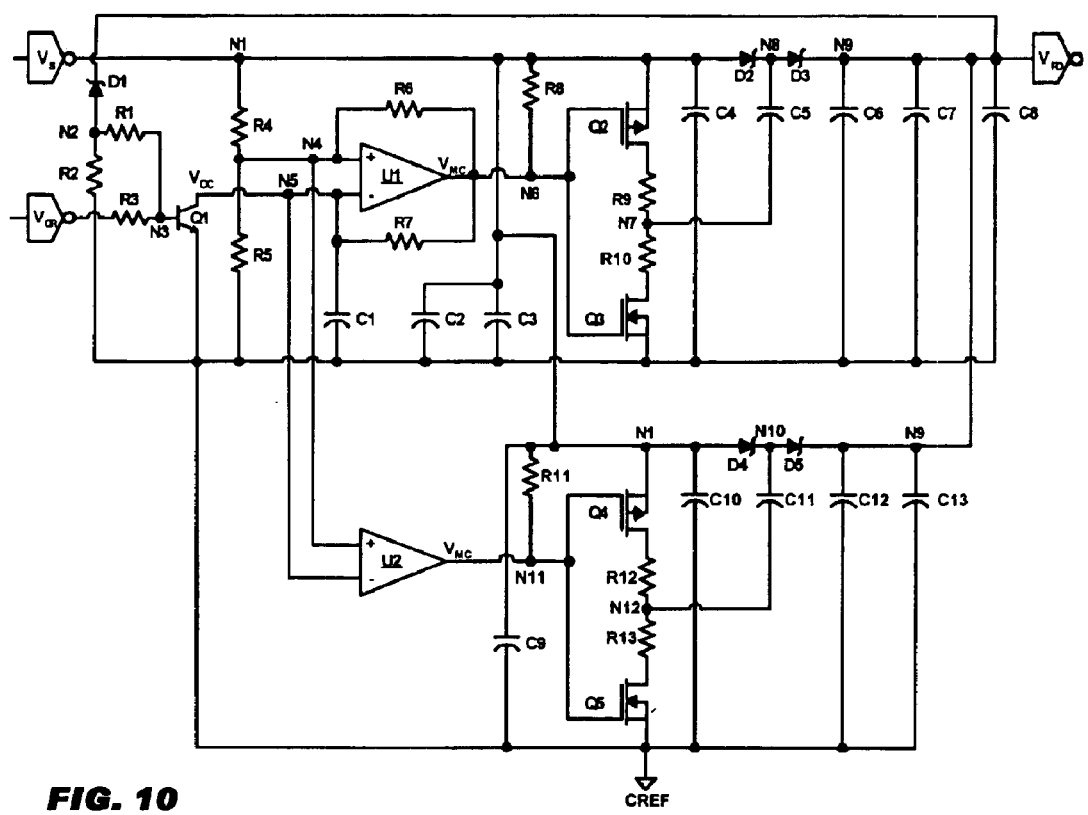
FIG. 10 illustrates one embodiment in accordance with the present invention of the voltage regulated transistor driver illustrated in FIG. 5.

FIG. 10 illustrates a preferred embodiment of transistor driver 42 (FIG. 5). A Schottky diode D1, a resistor R1, a resistor R2, and a NPN transistor Q1 constitute one embodiment of oscillation controller 52 (FIG. 5). Schottky diode D1 is electrically connected to a node N9 and a node N2. Resistor R1 (e.g., 49.9K ohms) is electrically connected to node N2 and a node N3. Resistor R2 (e.g., 1.00K ohms) is electrically connected to node N2 and a common reference CREF. A base terminal of transistor Q1 is electrically connected to node N3. A collector terminal of transistor Q1 is electrically connected to a node N5. An emitter terminal of transistor Q1 is electrically connected to common reference CREF.

Resistors R4–R8, a capacitor C1, a comparator U1, a resistor R11, and a comparator U2 constitute a multiple output embodiment of voltage oscillator 51 (FIG. 5). Resistor R4 (e.g., 24.9K ohms) is electrically connected to a node N1 and a node N4. Resistor R5 (e.g., 24.9K ohms) is electrically connected to node N4 and common reference CREF. Resistor R6 (e.g., 49.9K ohms) is electrically connected to node N4 and a node N6. Resistor R7 (e.g., 49.9K ohms) is electrically connected to node N5 and node N6. Resistor R8 (e.g., 1.00K ohms) is electrically connected to node N1 and node N6. Resistor R11 (e.g., 1.00K ohms) is electrically connected to node N1 and a node N11.

Capacitor C1 (e.g., 47 Pico farads) is electrically connected to node N5 and common reference CREF. Non-inverting inputs of comparators U1 and U2 are electrically connected to node N4. Inverting inputs of comparators U1 and U2 are electrically connected to node N5. An output of comparator U1 is electrically connected to node N6. An output of comparator U2 is electrically connected to node N11.

A p-channel MOSFET Q2, a n-channel MOSFET Q3, a resistor R9, a resistor RIO, a storage capacitor C5, a Schottky diode D2, a Schottky diode D3, a p-channel MOSFET Q4, a n-channel MOSFET Q5, a resistor R12, a resistor R13, a storage capacitor C11, schottky diode D4 and a Schottky diode D5 constitute a multi-output embodiment of voltage multiplier 61 (FIG. 5).

A gate terminal of p-channel MOSFET Q2 is electrically connected to node N6. A drain terminal of p-channel MOSFET Q2 is electrically connected to resistor R9. A source terminal of p-channel MOSFET Q2 is electrically connected to node N1. Resistor R9 (e.g., 10.0 ohms) is also electrically connected to a node N7.

A gate terminal of n-channel MOSFET Q3 is electrically connected to node N6. A drain terminal of n-channel MOSFET Q3 is electrically connected to resistor R10. A source terminal of n-channel MOSFET Q3 is electrically connected to common reference CREF. Resistor R10 (e.g., 10.0 ohms) is also electrically connected to node N7.

Storage capacitor C5 (e.g., 0.1 microfarads) is electrically connected to node N7 and a node N8. Schottky diode D2 is electrically connected to node N1 and node N8. Schottky diode D3 is electrically connected to node N8 and node N9.

A gate terminal of p-channel MOSFET Q4 is electrically connected to node N11. A drain terminal of p-channel MOSFET Q4 is electrically connected to resistor R12. A source terminal of p-channel MOSFET Q4 is electrically connected to node N1. Resistor R12 (e.g., 10.0 ohms) is also electrically connected to anode N12.

A gate terminal of n-channel MOSFET Q5 is electrically connected to node N11. A drain terminal of n-channel MOSFET Q5 is electrically connected to resistor R13. A source terminal of n-channel MOSFET Q5 is electrically connected to common reference CREF. Resistor R13 (e.g., 10.0 ohms) is also electrically connected to node N12.

Storage capacitor C11 (e.g., 0.1 microfarads) is electrically connected to a node N10 and node N12. Schottky diode D is electrically connected to node N1 and node N10. Schottky diode D5 is electrically connected to node N10 and node N9.

Additionally, the transistor driver of FIG. 10 further employs bypass capacitors and filtering capacitors. Specifically, a bypass capacitor C2 (e.g., 0.1 microfarads), a bypass capacitor C3 (e.g., 0.1 microfarads), and a bypass capacitor C9 (e.g., 0.1 microfarads) are electrically connected to node N1 and common reference CREF. A filtering capacitor C4 (e.g., 0.1 microfarads) and a filtering capacitor C10 (e.g., 0.1 microfarads) are also electrically connected to node N1 and common reference CREF. A filtering capacitor C6 (e.g., 0.1 microfarads), a filtering capacitor C7 (e.g., 0.1 microfarads), a filtering capacitor C8 (e.g., 220 microfarads), a filtering capacitor C12 (e.g., 0.1 microfarads), and a filtering capacitor C13 (e.g., 0.1 microfarads) are electrically connected to a node N9 and common reference CREF.

The following TABLE 2 illustrates an exemplary operation of the transistor driver illustrated in FIG. 10 based on a high voltage threshold $V_{HVT}$ that defines a hysteresis boundary between the voltage multiplier mode and the voltage follower mode, and a low voltage threshold $V_{LVT}$ that defines a hysteresis boundary between a fixed version of the voltage multiplier mode and a varying version of the voltage multiplier mode:

TABLE 2

| | Voltage Multiplier Mode | | Voltage |
| --- | --- | --- | --- |
| | Fixed Version | Varying Version | Follower Mode |
| Hysteresis Boundary | $V_S < V_{HVT}$ AND $V_{RD} < V_{LVT}$ | $V_S < V_{HVT}$ AND $V_{RD} > V_{LVT}$ | $V_S > V_{HVT}$ |
| Transistor Q1 | Cutoff Region | Active Region | Saturation Region |
| Transistor Q2 | Cutoff↔Active Fixed Frequency Fixed Duty Cycle | Cutoff↔Active Varying Frequency Varying Duty Cycle | Cutoff↔Active Zero → Frequency Zero → Duty Cycle |
| Transistor Q3 | Active↔Cutoff Fixed Frequency Fixed Duty Cycle | Active↔Cutoff Varying Frequency Varying Duty Cycle | Active↔Cutoff Zero → Frequency Zero → Duty Cycle |
| Storage Capacitor C5 | Charge↔Discharge Fixed Frequency Fixed Duty Cycle | Charge↔Discharge Varying Frequency Varying Duty Cycle | Charge↔Discharge Zero → Frequency Zero → Duty Cycle |
| Transistor Q4 | Cutoff↔Active Fixed Frequency Fixed Duty Cycle | Cutoff↔Active Varying Frequency Varying Duty Cycle | Cutoff↔Active Zero → Frequency Zero → Duty Cycle |
| Transistor Q5 | Active↔Cutoff Fixed Frequency Fixed Duty Cycle | Active↔Cutoff Varying Frequency Varying Duty Cycle | Active↔Cutoff Zero → Frequency Zero → Duty Cycle |
| Storage Capacitor C11 | Charge↔Discharge Fixed Frequency Fixed Duty Cycle | Charge↔Discharge Varying Frequency Varying Duty Cycle | Charge↔Discharge Zero → Frequency Zero → Duty Cycle |
| Regulated Drive Voltage $V_{RD}$ | $V_{RD} = (X1)V_S$ $X1 > 1$ | $V_{RD} = (X2)V_S$ $X2 = f(V_{RD})$ $X2 < X1$ | $V_{RD} \to V_S$ |

Further illustrated in FIG. 10 is a resistor R3 (e.g., 49.9K ohms) electrically connected to node N3 to thereby force transistor Q1 into a saturation region whenever an override voltage $V_{OR}$ is applied to resistor R3. This forces the voltage multiplier into the voltage follower mode.

Referring again to FIG. 3, the following TABLE 3 illustrates another exemplary operation of transistor driver 41 based on a low voltage threshold $V_{LVT}$ and a high voltage threshold $V_{HVT}$ that define a hysteresis boundary between the voltage multiplier mode and the voltage follower mode.

TABLE 3

| | Voltage Multiplier Mode | Voltage Follower Mode |
| --- | --- | --- |
| Hysteresis Boundary | $V_S < V_{HVT}$ AND $V_{RD} < V_{LVT}$ | $V_S > V_{HVT}$ OR $V_{RD} > V_{LVT}$ |
| Regulated Drive Voltage $V_{RD}$ | $V_{RD} = (X)V_S$ X (Fixed or Variable) > 1 | $V_{RD} \to V_S$ |

Figure 11:
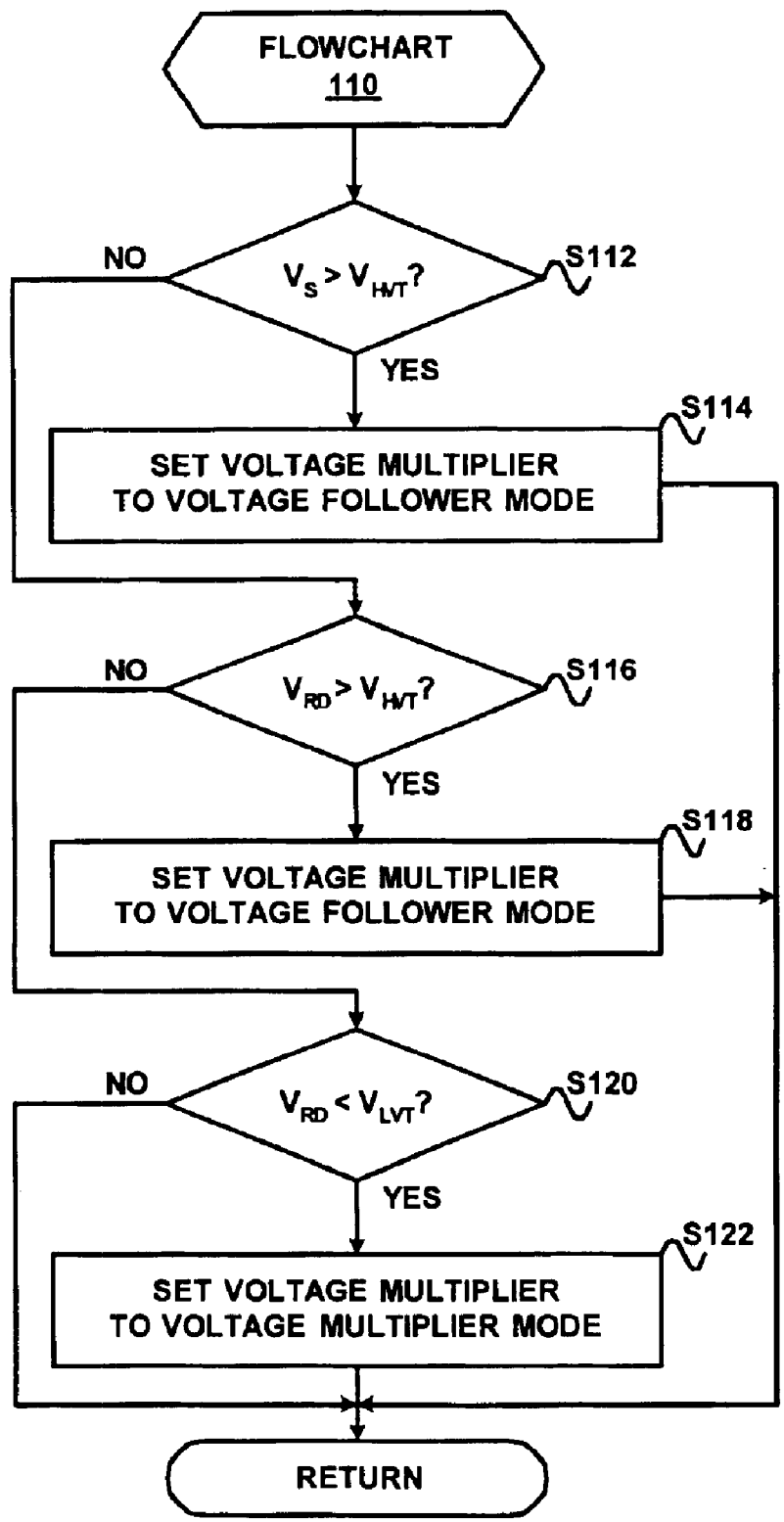
FIG. 11 illustrates a flowchart representative of a second embodiment of a transistor driver voltage regulation method in accordance with the present invention.

FIG. 11 illustrates a flowchart 110 representative of a method of operating transistor driver 41 (FIG. 11) in accordance with TABLE 3. During a stage S112, controller 50 (FIG. 3) ascertains whether source voltage $V_S$ is greater than high voltage threshold $V_{HVT}$. If so, then controller 50 proceeds to a stage S114 to set voltage multiplier 60 (FIG. 3) to the voltage follower mode via multiplier control voltage $V_{MC}$, and thereafter returns to stage S112.

Otherwise, controller 50 proceeds to a stage S116 to ascertain whether regulated drive voltage $V_{RD}$ is greater than high voltage threshold $V_{HVT}$. If so, then controller 50 proceeds to a stage S118 to set voltage multiplier 60 to the voltage follower mode via multiplier control voltage $V_{MC}$, and thereafter returns to stage S112.

Otherwise, controller 50 proceeds to a stage S120 to ascertain whether regulated drive voltage $V_{RD}$ is less than low voltage threshold $V_{LVT}$. If so, then controller 50 proceeds to a stage S122 to set voltage multiplier 60 to the voltage multiplier mode via multiplier control voltage $V_{MC}$, and thereafter returns to stage S112. Otherwise, controller 50 immediately returns to stage S112.

In practice of flowchart 110, the structural configurations of controller 50 and voltage multiplier 60 can employ one or more components for implementing the inventive principles of the present invention. For multiple component configurations, the components can be assembled as a common unit or distributed throughout a working environment of controller 50 and voltage multiplier 60. The component(s) of controller 50 and voltage multiplier 60 may employ digital circuitry, analog circuitry, or both (e.g. an application specific integrated circuit). Also, the component(s) of controller 50 and voltage multiplier 60 may be programmable hardware, a dedicated state machine, or a hybrid combination of programmable and dedicated hardware. Furthermore, to facilitate the implementations of the principals of the present invention, the structural configuration of controller 50 and voltage multiplier 60 can further employ any control clocks, interfaces, signal conditioners, filters, Analog-to-Digital (A/D) converters, Digital-to-Analog (D/A) converters, communication ports, or other types of operators as would occur to those having ordinary skill in the art.

Figure 12:
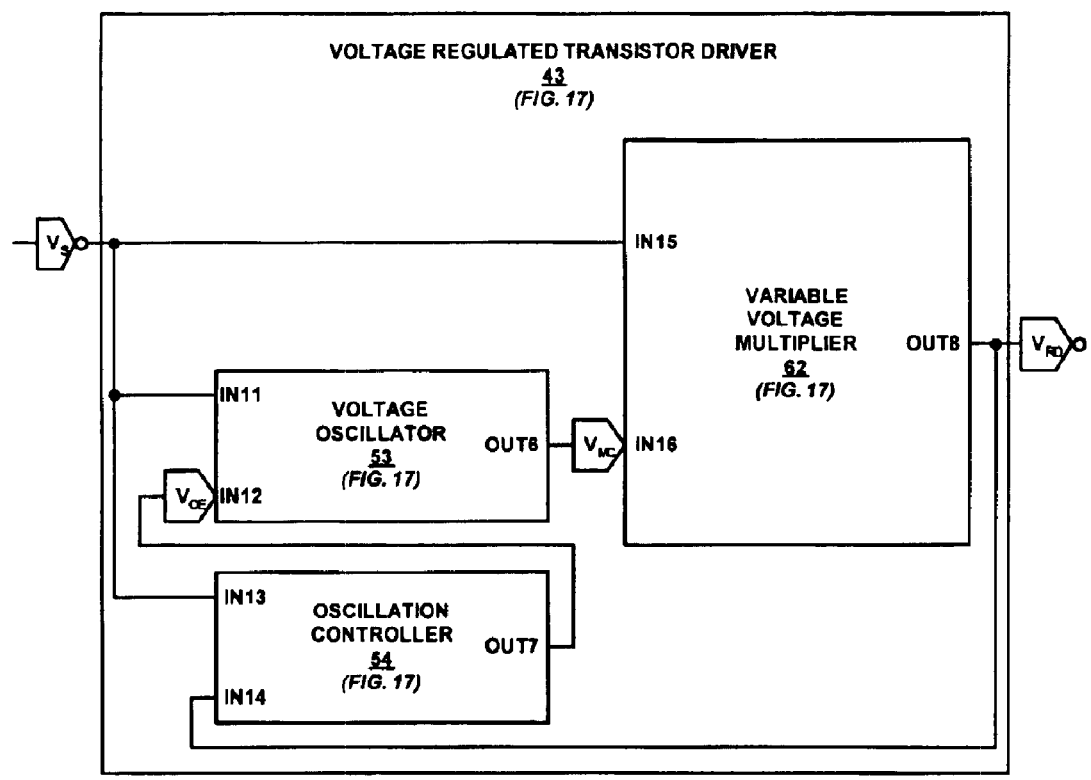
FIG. 12 illustrates a second embodiment in accordance with the present invention of the voltage regulated transistor driver illustrated in FIG. 3.

FIG. 12 illustrates a transistor driver 43 as one embodiment of transistor driver 41 (FIG. 3). Transistor driver 43 employs a voltage oscillator 53 and an oscillation controller 54, both of which constitute an embodiment of voltage multiplier controller 50 (FIG. 3). Transistor driver 43 further employs a variable voltage multiplier 62 as an embodiment of voltage multiplier 60.

Controller 54 receives an electrical communication of source voltage $V_S$ at an input IN13, and an electrical communication of regulated driver voltage $V_{RD}$ at an input IN14 from an output OUT8 of voltage multiplier 62. At an output OUT7, controller 54 generates an oscillation enable voltage $V_{OE}$ for enabling or disabling an oscillation of multiplier control voltage $V_{MC}$ by voltage oscillator 53. Controller 54 electrically communicates oscillation enable voltage $V_{OE}$ to an input N12 of voltage oscillator 53, which also receives an electrical communication of source voltage $V_S$ at an input IN11.

At an output OUT6, voltage oscillator 53 generates multiplier control voltage $V_{MC}$ and electrically communicates multiplier control voltage $V_{MC}$ to an input IN16 of voltage multiplier 62, which also receives an electrical communication of source voltage $V_S$ at an input IN15.

Figure 13:
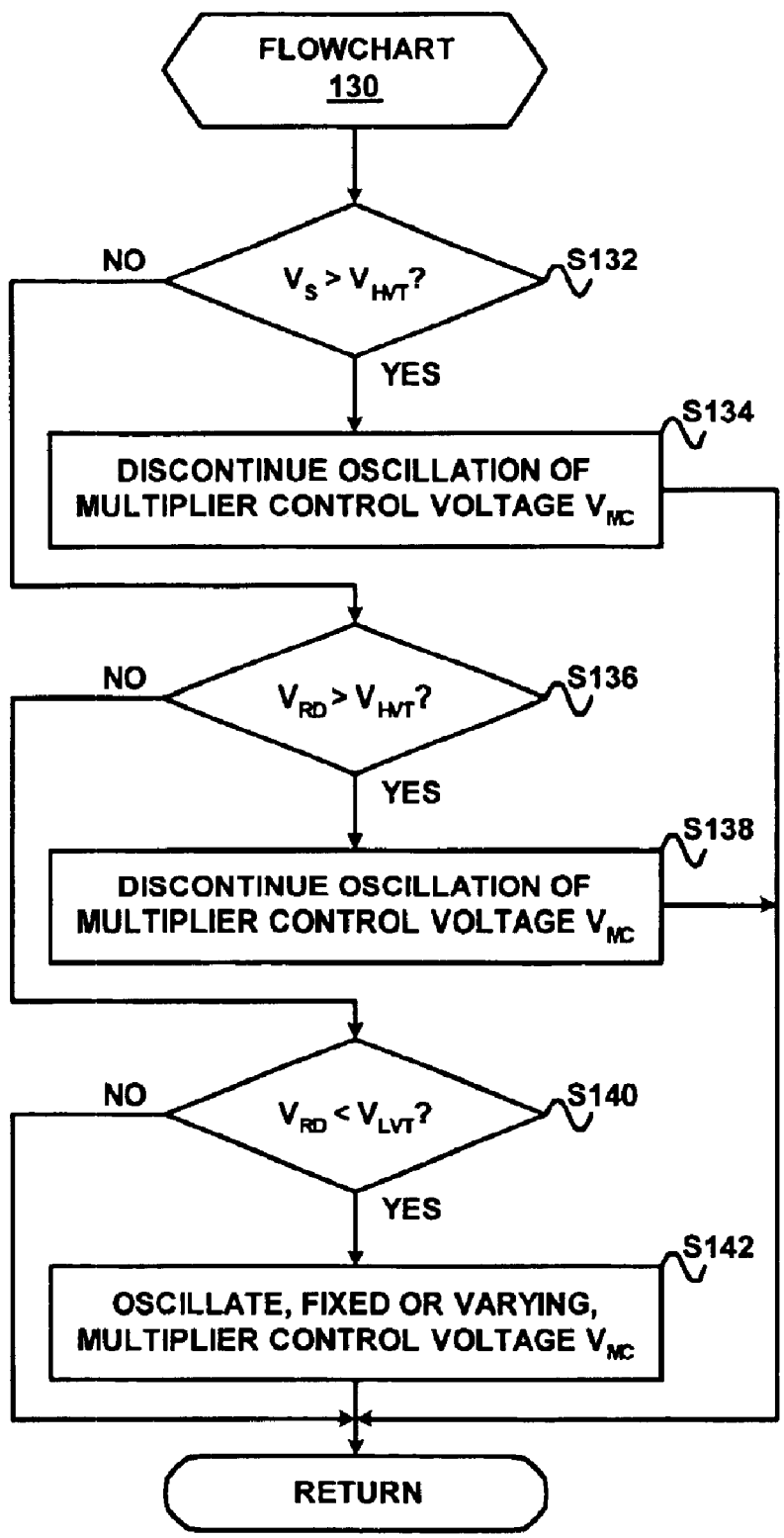
FIG. 13 illustrates a flowchart representative of one embodiment in accordance with the present invention of the transistor driver voltage regulation method illustrated in FIG. 11.

FIG. 13 illustrates a flowchart 130 representative of a method of operating transistor driver 43 in accordance with TABLE 3 as previously described herein. During a stage S132, controller 54 (FIG. 12) ascertains whether source voltage $V_S$ is greater than high voltage threshold $V_{HVT}$. If so, then controller 54 proceeds to a stage S134 to disable an oscillation of multiplier controller voltage $V_{MC}$ via oscillation enable voltage $V_{OE}$, and thereafter returns to stage S132.

Otherwise, controller 54 proceeds to a stage S136 to ascertain whether regulated drive voltage $V_{RD}$ is greater than high voltage threshold $V_{HVT}$. If so, then controller 54 proceeds to a stage S138 to disable an oscillation of multiplier control voltage $V_{MC}$ via oscillation enable voltage $V_{OE}$, and thereafter returns to stage S132.

Otherwise, controller 54 proceeds to a stage S140 to ascertain whether regulated drive voltage $V_{RD}$ is less than low voltage threshold $V_{LVT}$. If so, then controller 54 proceeds to a stage S142 to enable an oscillation of multiplier control voltage $V_{MC}$ via oscillation enable voltage $V_{OE}$, and thereafter returns to stage S132. Otherwise, controller 54 immediately returns to stage S132.

An exemplary implementation of flowchart 130 by transistor driver 43 involving a sequential increase of source voltage $V_S$ will now be described herein. In this exemplary implementation, low voltage threshold $V_{LVT}$ equals 13.0 volts and high voltage threshold $V_{HVT}$ equals 14.0 volts.

Figure 14:
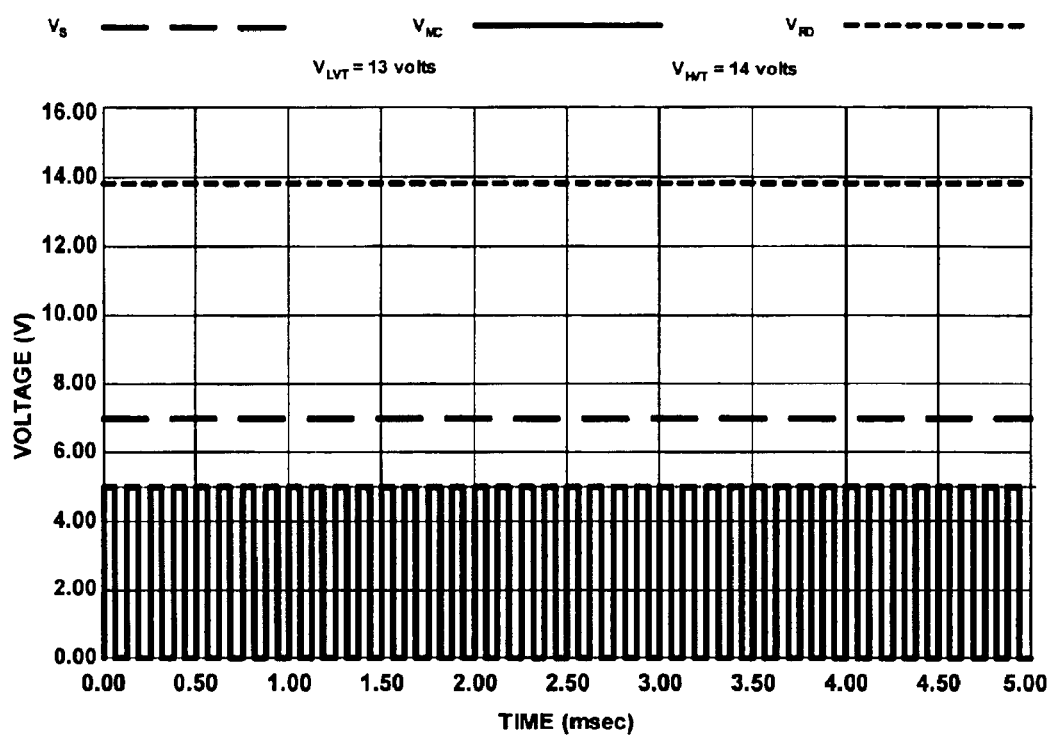
FIG. 14 illustrates an exemplary voltage multiplier mode during an implementation of the transistor driver voltage regulation method illustrated in FIG. 13 by the voltage regulated transistor driver illustrated in FIG. 12.

FIG. 14 illustrates source voltage Vs equaling 7.0 volts, and regulated drive voltage $V_{RD}$ equaling 13.75 volts (i.e., the gain of multiplier 62 is approximately 2.0). In accordance with stage S142, the oscillation of multiplier control voltage $V_{MC}$ is enabled in view of source voltage $V_S$ being less than 14.0 volts and regulated drive voltage $V_{RD}$ being less than 13.0 volts.

Figure 15:
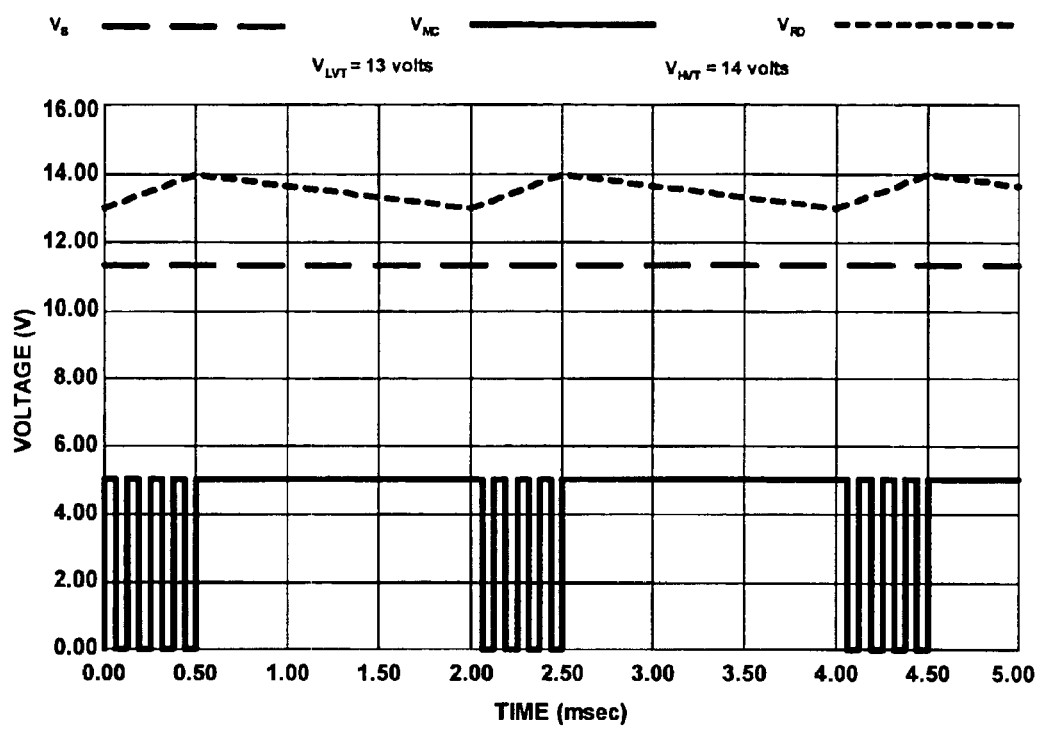
FIG. 15 illustrates an exemplary switching between a voltage multiplier mode and a voltage follower mode during an implementation of the transistor driver voltage regulation method illustrated in FIG. 13 by the voltage regulated transistor driver illustrated in FIG. 12.

FIG. 15 illustrates source voltage $V_S$ equaling 11.75 volts, and regulated drive voltage $V_{RD}$ ramping between 13.0 volts and 14.0 volts. In accordance with stages S138 and S142, the oscillation of multiplier control voltage $V_{MC}$ is cyclically enabled and disabled, respectively, in view of source voltage $V_S$ being less than 14.0 volts and regulated drive voltage $V_{RD}$ ramping between 13.0 volts and 14.0 volts.

Figure 16:
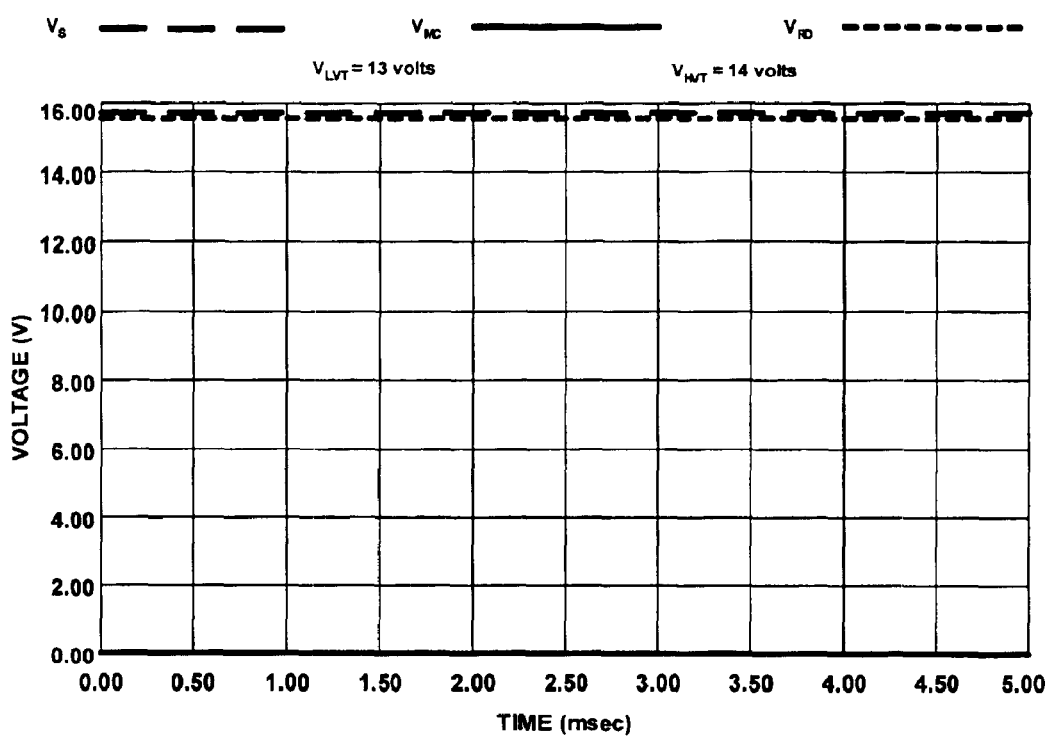
FIG. 16 illustrates an exemplary voltage follower mode of the transistor driver voltage regulation method illustrated in FIG. 13 by the voltage regulated transistor driver illustrated in FIG. 12.

FIG. 16 illustrates source voltage $V_S$ equaling 16.00 volts, and regulated drive voltage $V_{RD}$ equaling 15.85 volts (i.e., the gain of multiplier 62 is approximately 1.0). In accordance with stage S134, the oscillation of multiplier enable voltage $V_{MC}$ is disabled in view of source voltage $V_S$ being greater than 14.0 volts.

In practice of flowchart 130, the structural configurations of voltage oscillator 53, controller 54 and voltage multiplier 62 can employ one or more components for implementing the inventive principles of the present invention. For multiple component configurations, the components can be assembled as a common unit or distributed throughout a working environment of voltage oscillator 53, controller 54 and voltage multiplier 62. The component(s) of voltage oscillator 53, controller 54 and voltage multiplier 62 may employ digital circuitry, analog circuitry, or both (e.g. an application specific integrated circuit). Also, the component(s) of voltage oscillator 53, controller 54 and voltage multiplier 62 may be programmable hardware, a dedicated state machine, or a hybrid combination of programmable and dedicated hardware. Furthermore, to facilitate the implementations of the principals of the present invention, the structural configuration of voltage oscillator 53, controller 54 and voltage multiplier 62 can further employ any control clocks, interfaces, signal conditioners, filters, Analog-to-Digital (A/D) converters, Digital-to-Analog (D/A) converters, communication ports, or other types of operators as would occur to those having ordinary skill in the art.

Figure 17:
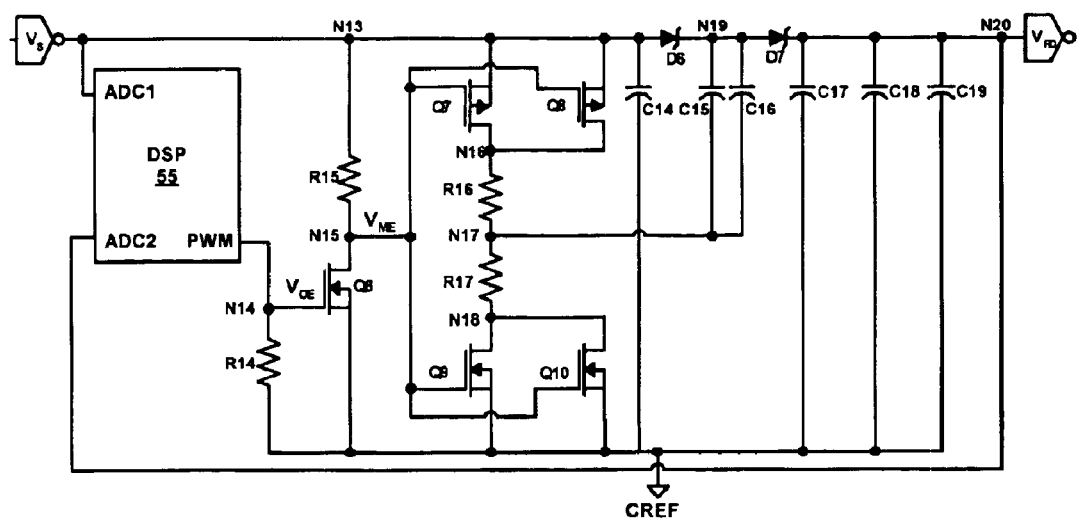
FIG. 17 illustrates one embodiment in accordance with the present invention of the transistor driver illustrated in FIG. 12.

FIG. 17 illustrates a preferred embodiment of transistor driver 43 (FIG. 12). A digital signal processor ("DSP") 55 constitutes one embodiment of oscillation controller 54 (FIG. 12). An analog-to-digital converter pin ADC1 of DSP 55 is electrically connected to a node N13. An analog-to-digital converter pin ADC2 of DSP 55 is electrically connected to a node N20. A pulse width modulation ("PWM") pin of DSP 55 is electrically connected to a node N14.

A resistor R14, a resistor R15 and a n-channel MOSFET Q6 constitute an embodiment of voltage oscillator 53 (FIG. 12). Resistor R14 (e.g., 10.0K ohms) is electrically connected to node N14 and common reference CREF. Resistor R15 (e.g., 1.00K ohms) is electrically connected to node N13 and a node N15. A gate terminal of n-channel MOSFET Q6 is electrically connected to node N14. A drain terminal of n-channel MOSFET Q6 is electrically connected to a node N15. A source terminal of n-channel MOSFET Q6 is electrically connected to common reference CREF.

A pair of p-channel MOSFETs Q7 and Q8, a pair of n-channel MOSFETs Q9 and Q10, a resistor R16, a resistor R17, a pair of storage capacitors C15 and C16, and a pair of Schottky diodes D6 and D7 constitute an embodiment of voltage multiplier 62 (FIG. 12).

Gate terminals of p-channel MOSFETs Q7 and Q8 are electrically connected to node N15. Drain terminals of p-channel MOSFETs Q7 and Q8 are electrically connected to a node N16. Source terminals of p-channel MOSFETs Q7 and Q8 are electrically connected to node N13. Resistor R16 (e.g., 10.0 ohms) is electrically connected to node N16 and a node N17.

Gate terminals of n-channel MOSFETs Q9 and Q10 are electrically connected to node N15. Drain terminals of n-channel MOSFETs Q9 and Q10 are electrically connected to a node N18. Source terminals of n-channel MOSFETs Q9 and Q10 are electrically connected to common reference CREF. Resistor R17 (e.g., 10.0 ohms) is electrically connected to node N17 and node N18.

Storage capacitors C15 and C16 (e.g., 0.1 microfarads) are electrically connected to node N17 and a node N19. Schottky diode D6 is electrically connected to node N13 and node N19. Schottky diode D7 is electrically connected to node N19 and node 20.

Additionally, the transistor driver of FIG. 17 further employs filtering capacitors. Specifically, a filtering capacitor C14 (e.g., 0.1 microfarads) is electrically connected to node N13 and common reference CREF. A filtering capacitor C17 (e.g., 0.1 microfarads), a filtering capacitor C18 (e.g., 0.1 microfarads), and a filtering capacitor C19 (e.g., 220 microfarads) are electrically connected to a node N20 and common reference CREF.

The following TABLE 4 illustrates an exemplary operation of transistor driver illustrated in FIG. 17 based on a low voltage threshold $V_{LVT}$ and a high voltage threshold $V_{HVT}$ that define a hysteresis boundary between the voltage multiplier mode and the voltage follower mode.

TABLE 4

|  | Voltage Multiplier Mode | Voltage Follower Mode |
| --- | --- | --- |
| Hysteresis Boundary | $V_S < V_{HVT}$ AND $V_{RD} < V_{LVT}$ | $V_S > V_{HVT}$ OR $V_{RD} > V_{LVT}$ |
| Transistor Q6 | Active Region (Oscillating) | Active Region (Zero Oscillation) |
| Transistors Q7 and Q8 | Cutoff↔Active Fixed/Varying Frequency Fixed/Varying Duty Cycle | Cutoff↔Active Zero Frequency Zero Duty Cycle |
| Transistors Q9 and Q10 | Active↔Cutoff Fixed/Varying Frequency Fixed/Varying Duty Cycle | Active↔Cutoff Zero Frequency Zero Duty Cycle |
| Storage Capacitors C15 and C16 | Charge↔Discharge Fixed/Varying Frequency Fixed/Varying Duty Cycle | Discharged |
| Regulated Drive Voltage $V_{RD}$ | $V_{RD} = (X)V_S$ $X > 1$ | $V_{RD} \rightarrow V_S$ |

From the description herein of the present invention, those having ordinary skill in the art will appreciate various benefits of the present invention, such as, for example, a regulation of a driver voltage for transistors that does not dangerously exceed a high voltage threshold whenever a transistor driver of the present invention is operating in a voltage multiplier mode.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A voltage regulated transistor driver in a system further employing a voltage source and at least one transistor, said voltage regulated transistor driver comprising:
   a variable voltage multiplier operable to generate a regulated driver voltage for driving the at least one transistor,
      wherein, in a voltage multiplier mode, the regulated driver voltage is greater than a source voltage electrically communicated to said voltage regulated transistor driver by the voltage source, and
      wherein, in a voltage follower mode, the regulated driver voltage approaches the source voltage to thereby equal or approximate the source voltage; and
   a voltage multiplier controller operable to electrically communicate a multiplier control voltage to said variable voltage multiplier,
      wherein the multiplier control voltage is indicative of a selection of one of the voltage multiplier mode and the voltage follower mode to thereby set said variable voltage multiplier in one of the voltage multiplier mode and the voltage follower mode.

2. The voltage regulated transistor driver of claim 1, wherein the multiplier control voltage indicates a selection of the voltage multiplier mode in response to the source voltage being less than a high voltage threshold.

3. The voltage regulated transistor driver of claim 2, wherein the multiplier control voltage indicates a selection of a fixed version of the voltage multiplier mode in response to the regulated driver voltage being less than a low voltage threshold.

4. The voltage regulated transistor driver of claim 2, wherein the multiplier control voltage indicates a selection of a varying version of the voltage multiplier mode in response to the regulated driver voltage being greater than a low voltage threshold.

5. The voltage regulated transistor driver of claim 1, wherein the multiplier control voltage indicates a selection of the voltage follower mode in response to the source voltage being greater than a high voltage threshold.

6. The voltage regulated transistor driver of claim 1, wherein the multiplier control voltage indicates a selection of the voltage multiplier mode in response to the source voltage being less than a high voltage threshold and the regulated driver voltage being less than a low voltage threshold.

7. The voltage regulated transistor driver of claim 1, wherein the multiplier control voltage indicates a selection of the voltage follower mode in response to the regulated driver voltage or the source voltage being greater than the high voltage threshold.

8. The voltage regulated transistor driver of claim 1, wherein said voltage multiplier controller includes:
   a voltage oscillator operable to generate and electrically communicate the multiplier control voltage to said variable voltage multiplier; and
   an oscillation controller operable to electrically communicate an oscillation control voltage to said voltage oscillator, the oscillation control voltage for controlling at least one of a frequency and a duty cycle of the multiplier control voltage.

9. The voltage regulated transistor driver of claim 8,
   wherein a fixed region of the voltage multiplier mode is defined by the source voltage being less than a high voltage threshold and the regulated driver voltage being less than a low voltage threshold; and
   wherein, in the fixed region of the voltage multiplier mode, the frequency and the duty cycle of the multiplier control voltage are fixed.

10. The voltage regulated transistor driver of claim 8,
    wherein a varying region of the voltage multiplier mode is defined by the source voltage being less than a high voltage threshold and the regulated driver voltage being greater than a low voltage threshold; and
    wherein, in the fixed region of the voltage multiplier mode, the frequency and the duty cycle of the multiplier control voltage are varied.

11. The voltage regulated transistor driver of claim 10, wherein the frequency and the duty cycle of the multiplier control voltage are varied as function of the relative magnitudes of the source voltage and the regulated driver voltage.

12. The voltage regulated transistor driver of claim 8,
    wherein, in the voltage follower mode, the frequency and the duty cycle of the multiplier control voltage approach zero.

13. The voltage regulated transistor driver of claim 1, wherein said voltage multiplier controller includes:
    a voltage oscillator operable to generate and electrically communicate the multiplier control voltage to said variable voltage multiplier; and
    an oscillation controller operable to electrically communicate an oscillation enable voltage to said voltage oscillator, the oscillation enable voltage for selectively enabling and disabling an oscillation of the multiplier control voltage by said voltage oscillator.

14. The voltage regulated transistor driver of claim 13, wherein, in the voltage multiplier mode, an oscillation of the multiplier control voltage is enabled.

15. The voltage regulated transistor driver of claim 13,
    wherein, in the voltage follower mode, an oscillation of the multiplier control voltage is disabled.

16. The voltage regulated transistor driver of claim 1,
    wherein, in the voltage multiplier mode and in the voltage follower mode, said variable voltage multiplier includes means for generating the regulated driver voltage as a product of the source voltage and a factor X; and
    wherein, in the voltage multiplier mode and in the voltage follower mode, said voltage multiplier controller includes means for controlling the factor X.

17. The voltage regulated transistor driver of claim 1,
    wherein said variable voltage multiplier includes means for generating the regulated driver voltage as a product of the source voltage and a factor X; and
    wherein, in the voltage follower mode, said voltage multiplier controller includes means for disabling said means for generating the regulated driver voltage as a product of the source voltage and a factor X.

18. In a system employing a voltage source, a transistor driver, and at least one transistor, a method of operating the transistor driver in regulating a drive voltage for driving the at least one transistor, the method comprising:

receiving an electrical communication of a source voltage from the voltage source; and electrically communicating the regulated driver voltage to the at least one transistor, wherein, in a voltage multiplier mode, the regulated driver voltage is greater than the source voltage, and wherein, in a voltage follower mode, the regulated driver voltage approaches the source voltage to thereby equal or approximate the source voltage.

19. The method of claim 18, further comprising:

operating in the voltage multiplier mode in response to the source voltage being less than a high voltage threshold.

20. The method of claim 19, further comprising:

operating in a fixed version of the voltage multiplier mode in response to the regulated driver voltage being less than a low voltage threshold.

21. The method of claim 19, further comprising:

operating in a varying region of the voltage multiplier mode in response to regulated driver voltage being greater than a low voltage threshold.

22. The method of claim 18, further comprising:

operating in the voltage follower mode in response to the source voltage ing greater than a high voltage threshold.

23. The method of claim 18, further comprising:

operating in the voltage multiplier mode in response to the source voltage eing less than a high voltage threshold and the regulated driver voltage being less than a low voltage threshold.

24. The method of claim 18, further comprising:

operating in the voltage follower mode in response to at least one of the regulated driver voltage and the source voltage being greater than the high voltage threshold.

25. A voltage regulated transistor driver employed in a system further employing a voltage source and at least on transistor, said voltage regulated transistor driver comprising:

means for receiving an electrical communication of a source voltage from the voltage source; and means for electrically communicating the regulated driver voltage to the at least one transistor, wherein, in a voltage multiplier mode, the regulated driver voltage is greater than the source voltage, and wherein, in a voltage follower mode, the regulated driver voltage approaches the source voltage to thereby equal or approximate the source voltage.

* * * * *